3,328,168
RUMINANT FEEDS CONTAINING $C_6$-$C_{20}$ OLEFINS
Eugene S. Erwin, St. Louis, and Gino J. Marco, Webster Groves, Mo., assignors to Monsanto Company, a corporation of Delaware
No Drawing. Filed June 7, 1963, Ser. No. 286,205
18 Claims. (Cl. 99—2)

This invention relates to novel animal feed compositions, and particularly compositions for optimum feeding of ruminants. More specifically, the invention involves the incorporation of additives which will affect the rumen microflora and promote a more efficient use of the nutrients in normal feeds.

In studying the effect of the various proposed additives for ruminant feeds, the development of data by feeding sheep or cattle is prohibitive both with respect to time and space requirements. Furthermore, the feed consumption of the animals is such that meaningful data could only be obtained by expending very large quantities of feed and unreasonable amounts of the proposed additives.

It has been known that the chemical compositions of the rumen fluids will reflect the well being of the ruminant and will provide a means of ascertaining the feed efficiency, the weight gain of the animal, and the adequacy of the feed. Rumen fluids contain a substantial proportion of volatile fatty acids, including acetic, propionic and butyric acids. These acids are derived from carbohydrate fermentation by rumen microflora and provide the principal source of energy to the animal. Of these fatty acids, the propionic acid content is most indicative of feed efficiency and weight gain. Increases in this component will be reflected immediately by improved feed utilization by the ruminant. These chemical changes in the rumen fluids can be measured by withdrawing samples of the fluid and determining the propionate content by chemical analysis. However, this procedure is also prohibitive because of the quantity of feed consumed and the size of the experimental adjuvant samples required.

It has been discovered that small scale in vitro experiments will enable the study of the effect of feed adjuvants without requiring a large number of animals or an unreasonable quantity of the feed components. It has also been found that these in vitro experimental data can be corroborated by in vivo experiments. Furthermore, the correlation of rumen fluid analysis and growth stimulation has been well established.

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alphacellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (22 to 23 hours) is taken, filtered through four layers of cheesecloth and 10 ml. of the fluid charged to each flask. A buffer solution of the following composition is prepared and adjusted to pH 6.8 with aqueous 4 N HCl.

|  | Buffer solution in grams per liter |
|---|---|
| $NaH_2PO_4$ | .316 |
| $KH_2PO_4$ | .152 |
| $NaHCO_3$ | 2.260 |
| $KCl$ | .375 |
| $NaCl$ | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

The flasks are purged with nitrogen, stoppered with pressure release valves and heated at 39° C.±0.5° C. on a water shaker bath. The fermentation mixtures are then incubated for 16 hours and analyzed to determine the propionate change, as increase or decrease in weight percent.

Using the above described in vitro technique it has been found that olefins added to ruminant feeds will stimulate growth and result in a more efficient utilization of feed components that will occur when the ruminants are fed with the identical feed without the olefins. The useful olefins are the unsaturated hydrocarbons with either branched or straight hydrocarbon chains of 6 to 20 carbon atoms. Preferred types are the straight chains with terminal unsaturation, the branched olefins with methyl side chains and the polymer of olefins having from 3 to 6 carbon atoms, such as propylene, butylene, pentenes and hexenes. The olefins may be prepared by cracking paraffin hydrocarbons of higher molecular weight or by the polymerization of propylene, isobutylene and other short chained olefinic hydrocarbons.

It has been found that from 0.1 percent by weight to 2.0 percent will produce a stimulation of rumen microflora and increase in propionate.

*Example 1*

A series of hydrocarbon olefins were studied to determine their effect in vitro in increasing the propionic acid content of rumen fluids by the above described procedure. Controls were run by identical prcoedures wherein the olefins were not included. The observed defferences in mol percent increase due to the presence of the olefin is set forth in the following table.

| Olefin | Propionate response increase in percent of control |
|---|---|
| Propylene dimer | 5.1 |
| 2,5-dimethyl hexadiene | 8.1 |
| 1-tetradecene | 7.1 |
| Diisobutylene | 1.1 |
| Hexadecene | 5.8 |
| $C_{10}$ to $C_{15}$ olefin mixture | 6.4 |
| n-Hexene dimer | 2.8 |
| Propylene trimer | 4.4 |
| 1-hexene-1-heptene codimer | 2.0 |
| 1-ercosine | 3.3 |

*Example 2*

A variety of olefins was studied in vivo to determine the percent increase in propionate when added to a normal diet. The rumen fluid analysis was made on fluids withdrawn from sheep fed a standard diet. The diet was then changed by including 2 percent by weight of an olefin and 20 hours later the rumen fluid was withdrawn and analyzed. The percent of increase was calculated and recorded in the following table:

| Olefin | Percent in Diet | Increase Percent Propionic Acid |
| --- | --- | --- |
| Triisobutylene | 2.0 | 158 |
| 1-dodecene | 2.0 | 148 |
| n-Hexene dimer | 2.0 | 130 |
| 2-methylpentene dimer | 2.0 | 149 |
| Propylene trimer | 2.0 | 144 |
| Propylene tetramer | 2.0 | 170 |
| Propylene pentamer | 2.0 | 135 |
| Tetrapropenyl succinic anhydride | 1.0 | 148 |

*Example 3*

Sheep were fed a normal diet containing one percent of 1-dodecene or one percent of propylene tetramer. After a predetermined period of time the sheep were weighed and compared with a control group of sheep fed the same diet except without the olefins. The following observations of feed per unit of weight increase were noted:

|  | Feed/gain in wt. |
| --- | --- |
| Control | 10.86 |
| 1-dodecene | 8.87 |
| Propylene tetramer | 9.78 |

*Example 4*

The procedure of Example 3 was repeated except different levels of 1-dodecene were included in the diets.

|  | Feed/gain in wt. |
| --- | --- |
| Control | 9.11 |
| 1-dodecene | 8.76 |
| 1.5 1-dodecene | 8.15 |

An essential component in ruminant feeds is the cellulosic roughage component. By the expression "cellulosic roughage," it is intended to refer to any nutrient component which contains at least 5% fiber. The fiber is principally cellulose which may also contain lignin chemically bound thereto. Typical fiber containing feeds include hay, straw, cottonseed hulls, cotton mill wastes, beet pulp, silage, ground corn cobs, corn stalks, oats, barley, cereal brans, and cereal middlings. One or more of these cellulosic roughage components is essential in balanced ruminant feeds and at least 0.5% by weight is included and as much as 60% or more may be used. However, in some areas cattle are fed with diets consisting essentially of barley and/or oats or substantially entirely of these high fiber cereals.

In the preparation of ruminant feeds at least one cellulosic roughage component is used and this component preferably present in excess of 2% by weight, although it may greatly exceed this preferred minimum content. These fiber containing components are conventional in ruminant feeds and are desirable because of their high fiber content and because the ruminant animal has the ability to digest such cellulosic components.

The ruminant feeds may contain natural oils including animal fats, such as beef tallow, mutton tallow, fish oils, including eel, herring, menhaden, tuna and salmon oil; and whale oil. The vegetable oils are usually of higher unsaturated acid content and are therefore generally liquid, for example soybean oil, sunflower oil, olive oil, safflower oil, corn oil, peanut oil, cotton seed oil, rice oil, millet oil, wheat germ oil and palm oil. Any of these may be included in the feed.

An optional component of the animal feeds is a non-toxic antioxidant. These substances tend to preserve vitamins and the unsaturation in oils by preventing the oxidation which normally occurs during the preparation, storage and use of the animal feeds. In the feed composition the use of from 0.001 to 0.1% by weight of the non-toxic antioxidant has been found to enable the stabilization of the unsaturation and to preserve the nutrient value of the feed during preparation, storage and use of the ruminant feed. Preferred usage involves the addition of from 0.005 to 0.05% of the non-toxic antioxidants.

Complete balanced feeds may contain, if desired, in addition to cellulosic roughage, natural oils and antioxidants, other components for example minerals, such as bone meal, salt and the various trace minerals including salts of zinc, copper, manganese, magnesium, cobalt, iodine and iron. Antibiotics, steroids, anthelmintics and other medicants may be used. Various vitamins, particularly A, B, E and D complexes may be added to provide deficiencies in these vitamins incident to the selection of the various components of the complete feed. Stilbestrol is another optional component. Other basic nutrients such as casein, other milk by-products, and synthetic chemicals such as urea, may be used if desired or if they are necessary to satisfy the requirements of the complete feed.

Although the benefits of the invention are described with respect to a specific example, it is not intended that the details thereof should be limitative to the extent that they are encountered in the following claims.

The embodiments of the invention in which an exclusive property or privilege is claimed are defined as follows:

1. A ruminant feed which comprises at least one cellulosic roughage feed component and a hydrocarbon olefin having at least six and a maximum of twenty carbon atoms, said olefin being present in an amount sufficient to stimulate growth.

2. A ruminant feed comprising a hydrocarbon olefin having at least six and a maximum of twenty carbon atoms, said olefin being present in an amount of at least about 0.1 percent by weight; a cellulosic roughage feed component; and at least one component selected from the group consisting of natural oils, antioxidants, vitamins, minerals and medicants.

3. A conventional feed for ruminant animals which contains a hydrocarbon olefin having at least six and a maximum of twenty carbon atoms, said olefin being present in an amount of at least about 0.1 percent by weight.

4. A ruminant feed comprising from 0.5 to 60 percent of a cellulosic feed component containing at least 5 percent fiber, and from about 0.1 to 2 percent by weight of a hydrocarbon olefin having at least six and a maximum of twenty carbon atoms.

5. A ruminant feed which comprises at least one cellulosic roughage feed component and at least about 0.1 percent by weight 1-tetradecene.

6. A ruminant feed which comprises at least one cellulosic roughage feed component and at least about 0.1 percent by weight hexadecene.

7. A ruminant feed which comprises at least one cellulosic roughage feed component and at least about 0.1 percent by weight propylene trimer.

8. A ruminant feed which comprises at least one cellulosic roughage feed component and a mixture of olefins having at least 10 and a maximum of 15 carbon atoms, said mixture being present in an amount of at least about 0.1 percent by weight.

9. A ruminant feed which comprises at least one cellulosic roughage feed component and from about 0.1 to 2.0 percent by weight of 1-tetradecene.

10. A ruminant feed which comprises at least one cellulosic roughage feed component and from about 0.1 to 2.0 percent by weight of hexadecene.

11. A ruminant feed which comprises at least one cellulosic roughage feed component and from about 0.1 to 2.0 percent by weight of a propylene trimer.

12. A ruminant feed which comprises at least one cellulosic roughage feed component and from about 0.1 to 2.0 percent by weight of a mixture of olefins having at least 10 and a maximum of 15 carbon atoms.

13. A method of stimulating growth and feed efficiency of ruminants which comprises feeding said ruminants a mixture of conventional feed components and a hydrocarbon olefin having at least six and a maximum of twenty carbon atoms, said olefin being present in an amount sufficient to stimulate growth.

14. A method of stimulating growth and feed efficiency of ruminants which comprises feeding them a ration comprising at least one cellulosic roughage feed component and from about 0.1 to 2.0 percent by weight of a hydrocarbon olefin having at least six and a maximum of twenty carbon atoms.

15. A method of stimulating growth and feed efficiency of ruminants which comprises feeding them a ration comprising at least one cellulosic roughage feed component and from about 0.1 to 2.0 percent by weight of 1-tetradecene.

16. A method of stimulating growth and feed efficiency of ruminants which comprises feeding them a ration comprising at least one cellulosic roughage feed component and from about 0.1 to 2.0 percent by weight of hexadecene.

17. A method of stimulating growth and feed efficiency of ruminants which comprises feeding them a ration comprising at least one cellulosic roughage feed component and from about 0.1 to 2.0 percent by weight of a propylene trimer.

18. A method of stimulating growth and feed efficiency of ruminants which comprises feeding them a ration comprising at least one cellulosic roughage feed component and from about 0.1 to 2.0 percent by weight of a mixture of olefins having at least 10 and a maximum of 15 carbon atoms.

References Cited

UNITED STATES PATENTS 2,768,896  10/1956  Lewis _____ 99—2

OTHER REFERENCES

Feedstuffs: page 242, Springer Publishing Co., Inc., New York, N.Y. (1957).

Morrison: Feeds & Feeding, 23rd ed., pages 1132–34, the Morrison Publishing Co., Ithaca, N.Y. (1957).

Merck Index: page 788, Merck and Co., Inc., Rahway, N.J. (1960). 28—Federal Register, page 5016, May 28, 1963.

Rose et al.: Condensed Chemical Dictionary, page 843, Reinhold Publishing Corp., New York, N.Y. (1956).

A. LOUIS MONACELL, *Primary Examiner.*

D. J. DONOVAN, *Assistant Examiner.*